United States Patent
Oya

(10) Patent No.: US 8,467,938 B2
(45) Date of Patent: Jun. 18, 2013

(54) ELECTRIC POWER STEERING APPARATUS

(75) Inventor: Toshiaki Oya, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 416 days.

(21) Appl. No.: 12/997,967

(22) PCT Filed: Jun. 30, 2009

(86) PCT No.: PCT/JP2009/061965
§ 371 (c)(1),
(2), (4) Date: Dec. 14, 2010

(87) PCT Pub. No.: WO2010/001895
PCT Pub. Date: Jan. 7, 2010

(65) Prior Publication Data
US 2011/0098889 A1    Apr. 28, 2011

(30) Foreign Application Priority Data

Jul. 3, 2008    (JP) ................ 2008-174191

(51) Int. Cl.
*H02J 7/00*    (2006.01)
*B62D 6/00*    (2006.01)
*B62D 5/04*    (2006.01)
*H02P 5/00*    (2006.01)

(52) U.S. Cl.
USPC ........... 701/41; 701/42; 320/118; 318/105; 318/106; 318/139; 180/446

(58) Field of Classification Search
USPC ........... 701/41, 42; 180/443, 446; 318/105, 318/106, 130, 139, 479, 504; 320/116, 118, 320/121, 124
See application file for complete search history.

(56) References Cited

U.S. PATENT DOCUMENTS

2009/0140673 A1* 6/2009 Kasai et al. ............. 318/139
2010/0264857 A1* 10/2010 Nagase ................... 318/139

FOREIGN PATENT DOCUMENTS

| JP | A-07-231510 | 8/1995 |
| JP | A-11-089270 | 3/1999 |
| JP | A-2003-312522 | 11/2003 |
| JP | A-2008-062712 | 3/2008 |

OTHER PUBLICATIONS

International Preliminary Report on Patentability issued in Application No. PCT/JP2009/061965; Dated Feb. 8, 2011.
International Search Report issued in Application No. PCT/JP2009/061965; Dated Sep. 15, 2009 (With Translation).

* cited by examiner

*Primary Examiner* — Christine Behncke
(74) *Attorney, Agent, or Firm* — Oliff & Berridge, PLC

(57) ABSTRACT

In an electric power steering apparatus of the invention, a control circuit determines a command value of drive voltage supplied to a motor drive circuit based on an actual current through a motor and a target current. When the command value exceeds the previous value having a lower limit equivalent to a limit value representing the limit of the power supply from a battery, the control circuit controls the amount of discharge from the auxiliary power supply according to a difference between the command value and the previous value by increasing or decreasing a duty of switching devices. Thus, the power steering apparatus can save the energy of the auxiliary power supply for efficiently using the auxiliary power supply.

3 Claims, 3 Drawing Sheets

ELECTRIC POWER STEERING APPARATUS

TECHNICAL FIELD

The present invention relates to an electric power steering apparatus that is mounted in a vehicle and generates a steering assist force by a motor.

BACKGROUND ART

Electric power steering apparatus is a machine which operates the motor for generating the steering assist force according to a steering torque applied by a driver. Recently, such an electric power steering apparatus has been faced with a demand for high power operation. To meet this demand, there has been proposed an electric power steering apparatus wherein an auxiliary power supply independent from a battery is connected in series to the battery as needed so as to supply high electric power at high voltage (see, for example, Patent Document 1).

An electric double-layer capacitor, for example, may be used as the above auxiliary power supply. Such an auxiliary power supply must always be charged so as to be ready for use. However, it takes some time to charge the power supply having a low amount of remaining electric energy. Furthermore, charge control poses a substantial load on a control circuit for the electric power steering apparatus. It is therefore crucial to hold down the waste of the energy of the auxiliary power supply to a minimum. By the way, the auxiliary power supply is needed when the power supplied by the battery alone falls short. This means that the auxiliary power supply is used whenever the power from the battery falls short, regardless of the extent of such shortage of the power. If the auxiliary power supply operates at full capacity even when the power shortage is moderate, the auxiliary power supply is activated excessively as a result, and the energy of the auxiliary power supply is consumed more than necessary.

Citation List

Patent Literature
Patent Document 1: Japanese Unexamined Patent Publication No. 2008-62712 (FIG. 1)

DISCLOSURE OF THE INVENTION

In view of the foregoing, the present invention has an object to provide an electric power steering apparatus which is capable of saving the energy of the auxiliary power supply for efficiently using the auxiliary power supply.

According to the present invention, an electric power steering apparatus that generates a steering assist force by a motor comprises: (a) a motor drive circuit for driving the motor; (b) a current detector for detecting an actual current supplied from the motor drive circuit to the motor; (c) a battery for supplying a drive voltage to the motor drive circuit; (d) an auxiliary power supply connected in series to the battery and capable of supplying a drive voltage to the motor drive circuit; (e) a discharge circuit including switching devices for alternately opening and closing a first electrical conduction path for supplying the motor drive circuit with a drive voltage from the battery alone and a second electrical conduction path for supplying the motor drive circuit with a drive voltage from a series connection of the battery and the auxiliary power supply; and (f) a control circuit that controls the motor drive circuit for driving the motor to generate the steering assist force, the control circuit determining a command value of a drive voltage to be supplied to the motor drive circuit based on the actual current and a target current and controlling the amount of discharge from the auxiliary power supply according to a difference between the command value and its previous value if the command value exceeds the previous value having a lower limit equivalent to a limit value representing the limit of the power supply from the battery.

In the electric power steering apparatus arranged as described above, the control circuit controls the amount of discharge from the auxiliary power supply according to the difference between the command value of the drive voltage and the previous value having the lower limit equivalent to the limit value when the command value exceeds the previous value. This prevents an undue voltage supply from the auxiliary power supply thereby accomplishing an adequate voltage supply. Thus is provided the electric power steering apparatus which is capable of saving the energy of the auxiliary power supply for efficiently using the auxiliary power supply.

The above electric power steering apparatus may also have an arrangement wherein, when the command value is more than the previous value having the lower limit equivalent to the limit value, the control circuit sequentially increases a discharge duty equivalent to a period in which the second electrical conduction path is closed, but when the command value is less than the previous value having the lower limit equivalent to the limit value and the discharge duty is more than zero, the control circuit sequentially decreases the discharge duty.

In this case, the increase in the discharge duty leads to an increased rate of time in which the voltage is supplied from the series connection of the battery and the auxiliary power supply, so that the drive voltage is raised. Conversely, the decrease in the discharge duty leads to an increased rate of time in which the voltage is supplied from the battery alone, so that the drive voltage is lowered. Accumulation operation of sequential increase or decrease of the discharge duty is performed to make the fluctuation of the drive voltage smooth.

The above electric power steering apparatus may further comprise: a voltage detector for detecting an auxiliary power supply voltage generated between terminals of the auxiliary power supply; and a charge circuit for charging the auxiliary power supply based on the voltage of the battery, and have an arrangement wherein, when the command value is less than the previous value having the lower limit equivalent to the limit value and if a discharge duty is more than zero, the control circuit sequentially decreases the discharge duty, and consequently when the discharge duty is decreased to zero and the auxiliary power supply voltage is decreased to below a predetermined threshold value, the control circuit drives the charge circuit to charge the auxiliary power supply.

In this case, the steering apparatus can obviate the waste of energy because charging the auxiliary power supply is performed when the discharge from the auxiliary power supply is not required. Furthermore, if the voltage of the auxiliary power supply is equal to or more than the threshold value, the steering apparatus does not charge the auxiliary power supply thereby avoiding an undue charging of the auxiliary power supply.

MODE FOR CARRYING OUT THE INVENTION

Figure 1:
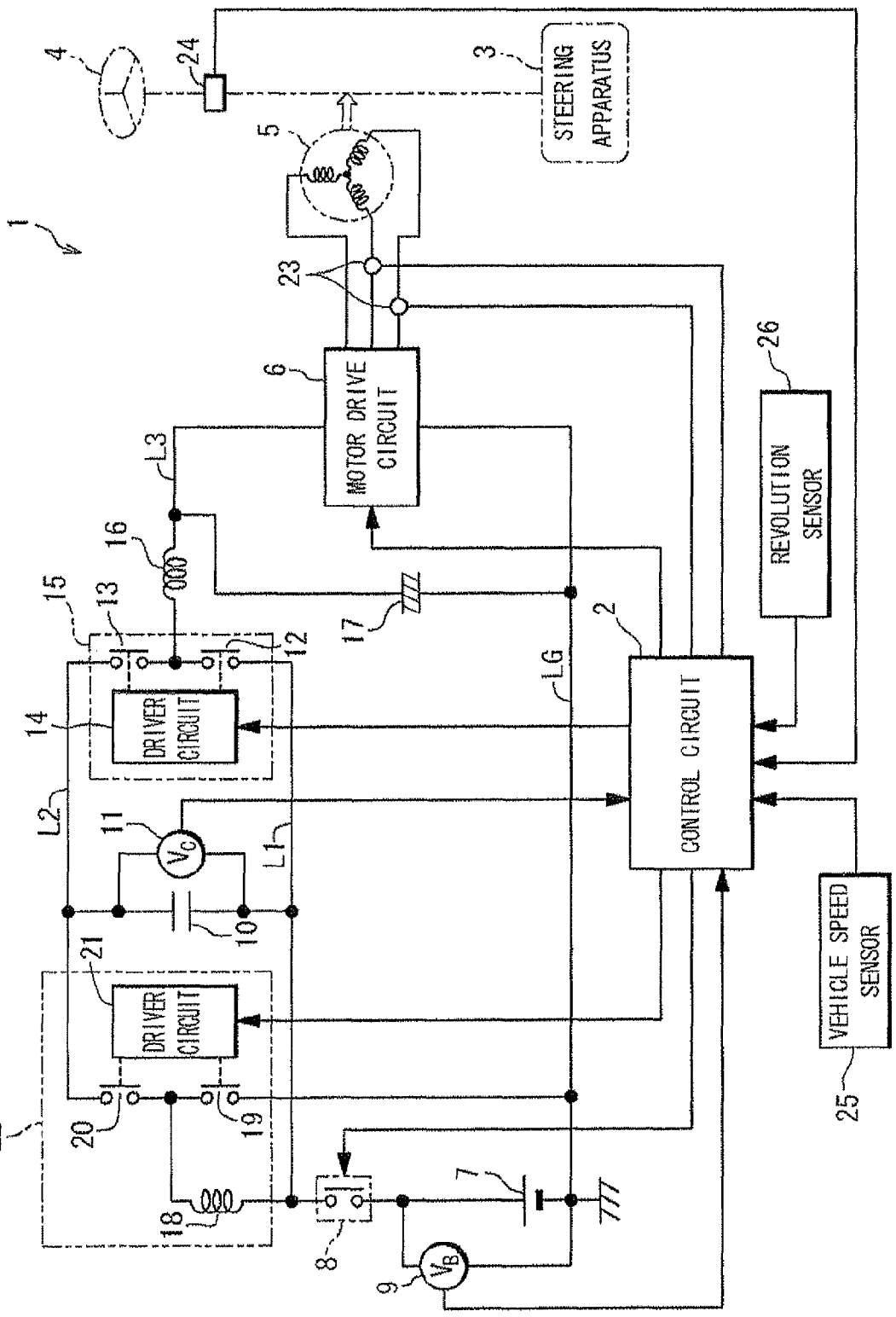
FIG. 1 is a circuit diagram principally showing an electric circuit of a general arrangement of an electric power steering apparatus according to one embodiment of the present invention.

FIG. 1 is a circuit diagram principally showing an electric circuit of a general arrangement of an electric power steering apparatus 1 according to one embodiment of the present invention. Referring to the figure, a steering apparatus 3 is driven by a steering torque applied to a steering wheel 4 by a driver and a steering assist force generated by a motor 5. The motor 5 is a 3-phase brushless motor which is driven by a motor drive circuit (inverter) 6. The motor drive circuit 6, the internal configuration of which is not shown, includes six switching devices constituting a 3-phase bridge circuit, and a drive circuit for switching on and off these devices. This motor drive circuit 6 is controlled by a control circuit 2.

The motor drive circuit 6 is connected to a negative electrode of a battery 7 via a ground-side electrical conduction path LG. The battery 7 serves as a main power supply for supplying electric power to the motor drive circuit 6. The battery 7 is connected in series with a relay contact 8 and connected in parallel with a voltage detector 9. The relay contact 8 is normally closed and is controllably opened and closed by the control circuit 2. The voltage detector 9 detects a voltage generated across the battery 7 (referred to as "battery voltage $V_B$") and sends detection signals to the control circuit 2.

An auxiliary power supply 10 includes an electrical double-layer capacitor and is connected in series to the battery 7. A voltage detector 11 is connected in parallel to the auxiliary power supply 10. The voltage detector 11 detects a voltage generated across the auxiliary power supply 10 (referred to as "capacitor voltage $V_C$") and sends detection signals to the control circuit 2.

With the relay contact 8 closed, the battery voltage $V_B$ is applied to an electrical conduction path L1, while a combined voltage ($V_B+V_C$) of the battery voltage $V_B$ and the capacitor voltage $V_C$ is applied to an electrical conduction path L2. Therefore, the motor drive circuit 6 is supplied with the maximum voltage of ($V_B+V_C$) when the auxiliary power supply 10 is used. When the auxiliary power supply 10 is not used, the motor drive circuit 6 is supplied with the voltage $V_B$.

The electrical conduction paths L1 and L2 are connected to a reactor 16 leading to an electrical conduction path L3 via switching devices 12 and 13 (MOS-FETs), respectively. The electrical conduction path L3 leads to the motor drive circuit 6. A smoothing condenser 17 is connected in parallel to the motor drive circuit 6. The switching devices 12, 13 are controlled by a driver circuit (FET driver) 14 in a manner such that these devices are alternately turned on. This is the PWM control through which an arbitrary voltage between the voltage ($V_B+V_C$) and the voltage $V_B$ can be generated by high-speed switching operation of the switching devices with a regulated duty. It is also possible to make either one of the switching devices 12, 13 normally-closed and the other device normally-opened by setting a duty of either of the devices to 1 and that of the other device to 0.

The driver circuit 14 is controlled by the control circuit 2. The switching devices 12, 13 and driver circuit 14 constitute a discharge circuit 15. The discharge circuit 15 includes the switching devices 12, 13 which alternately open and close the first electrical conduction path L1 for supplying the motor drive circuit 6 with a drive voltage from the battery 7 alone and the second electrical conduction path L2 for supplying the motor drive circuit 6 with a drive voltage from a series connection of the battery 7 and the auxiliary power supply 10.

In each of the switching devices 12 and 13, there exists an unillustrated parasitic diode connected in inverse-parallel with the switching device illustrated by a symbol of contact (cathode of which is connected to the high-potential side and anode of which is connected to the low potential side) (The same goes for other switching devices 19, 20).

The auxiliary power supply 10 is charged by a charge circuit 22. The charge circuit 22 includes a reactor 18, the switching devices (MOS-FETs) 19, 20 which are alternately turned on and a driver circuit (FET driver) 21 for switching on and off the switching devices 19, 20. The driver circuit 21 applies PWM control to the switching devices 19, 20 so as to regulate on-off duties thereof. The driver circuit 21 is controlled by the control circuit 2.

Two of the three electrical conduction paths connecting the motor drive circuit 6 and the motor 5 are provided with current detectors 23, which are connected to the control circuit 2. Based on outputs from the current detectors 23, the control circuit 2 can detect an actual current supplied from the motor drive circuit 6 to the motor 5.

On the other hand, an output signal from a torque sensor 24 detecting a steering torque applied to the steering wheel 4 is inputted to the control circuit 2. Further, an output signal from a vehicle speed sensor 25 detecting a vehicle speed and an output signal from a revolution sensor 26 detecting the number of engine revolutions are inputted to the control circuit 2.

In the electric power steering apparatus 1 of the above arrangement, the control circuit 2 operates as follows. When detecting a start of the engine based on the output signal from the revolution sensor 26, the control circuit 2 closes the relay contact 8 to permit the driving of the motor 5. Based on the steering torque signal sent from the torque sensor 24 and the vehicle speed signal sent from the vehicle speed sensor 25, the control circuit 2 operates the motor drive circuit 6 to drive the motor 5 so as to generate a proper steering assist force. According to a required steering assist force, the control circuit 2 controls source voltage in a manner such that one of the switching devices 12, 13 is turned on while the other is turned off.

On the other hand, when the switching device 19 is in the on state and the switching device 20 is in the off state in the charge circuit 22 for the auxiliary power supply 10, the current from the battery 7 flows through the relay contact 8, reactor 18 and the switching device 19. When the switching device 19 turns its state from on to off (the switching device 20 is turned to the on state), a high voltage is generated in the reactor 18 so as to interfere with the change of magnetic flux induced by current interruption. Thus, the auxiliary power supply 10 is charged at a voltage increased from an output voltage from the battery 7. Therefore, the auxiliary power supply 10 can be charged by repeating the on/off operations of the switching devices 19, 20. The control circuit 2 monitors the voltage $V_C$ of the auxiliary power supply 10 so that, if the voltage is below a certain level, the auxiliary power supply 10 is charged by switching on and off the switching devices 19, 20 by means of the driver circuit 21.

Figure 2:
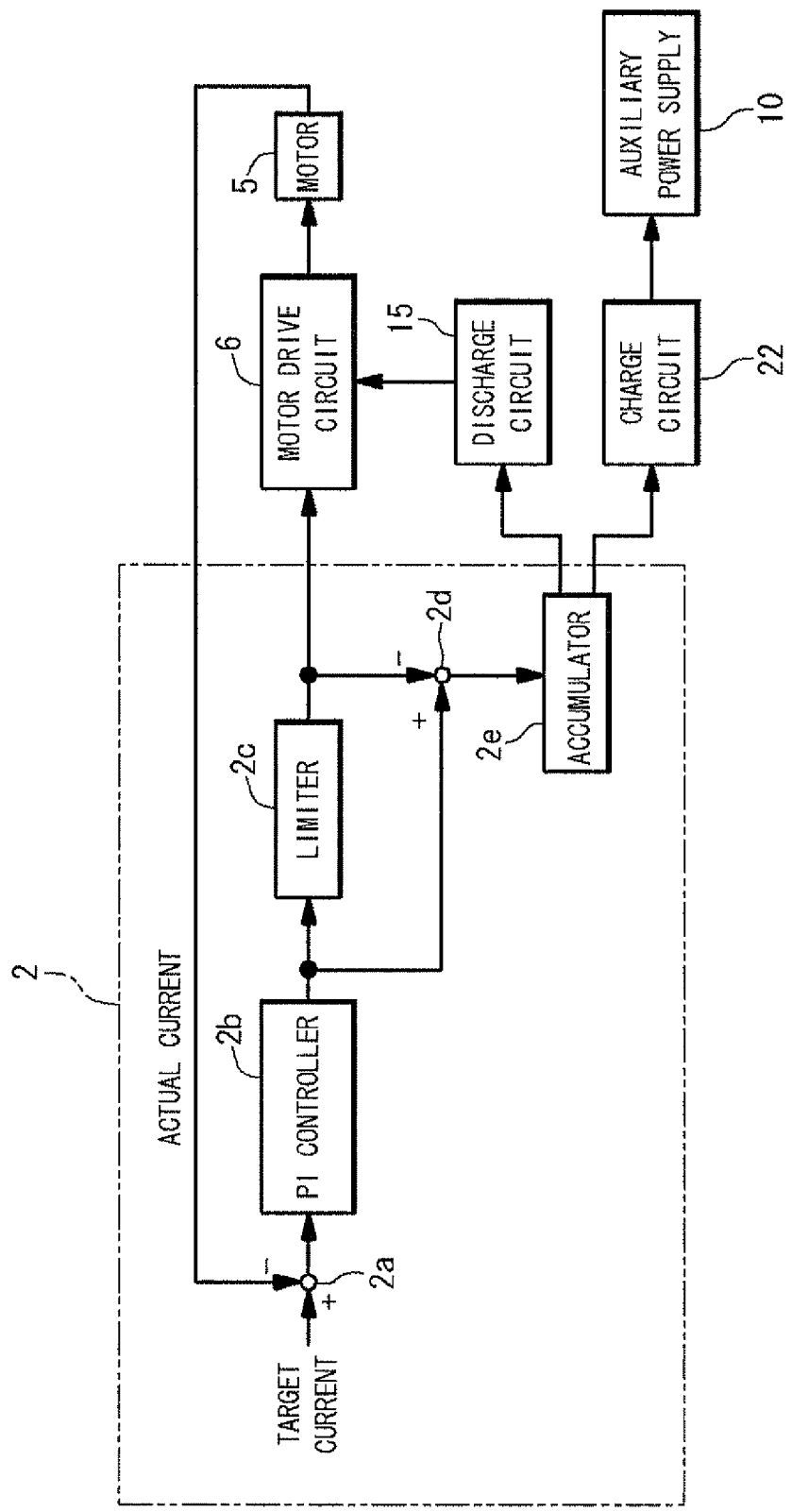
FIG. 2 is a block diagram showing a control system responsible for motor control, drive voltage control and charge control.

FIG. 2 is a block diagram showing a control system responsible for motor control, drive voltage control and charge control. The control circuit 2 includes, as internal functions, a subtractor 2a for calculating a difference between a target current defined based on the steering torque and vehicle speed and a feedback signal indicating an actual current through the motor 5; a PI (proportional-integral) controller 2b; a limiter 2c; a subtractor 2d for calculating a difference between a PI voltage command (command value of drive voltage) as an output from the PI controller 2b and an output voltage command from the limiter 2c; and an accumulator 2e for accumulating the differences obtained by the subtractor 2d.

Such internal functions perform a limiting operation to convert the PI voltage command following the target current into a drive signal for the motor drive circuit 6. The motor 5 is driven by the signal. Further, the PI voltage command is compared with the previous value having a lower limit equivalent to a limit value of the limiting operation (the value of the previous PI voltage command having the lower limit equivalent to the limit value) so as to be sequentially subjected to an accumulation operation according to the comparison result. The discharge duty of the discharge circuit 15 is controlled according to the result of the accumulation operation. Thus is decided the drive voltage supplied to the motor drive circuit 6 and the motor 5. On the other hand, the charge circuit 22 is driven under a given condition so as to charge the auxiliary power supply 10.

Figure 3:
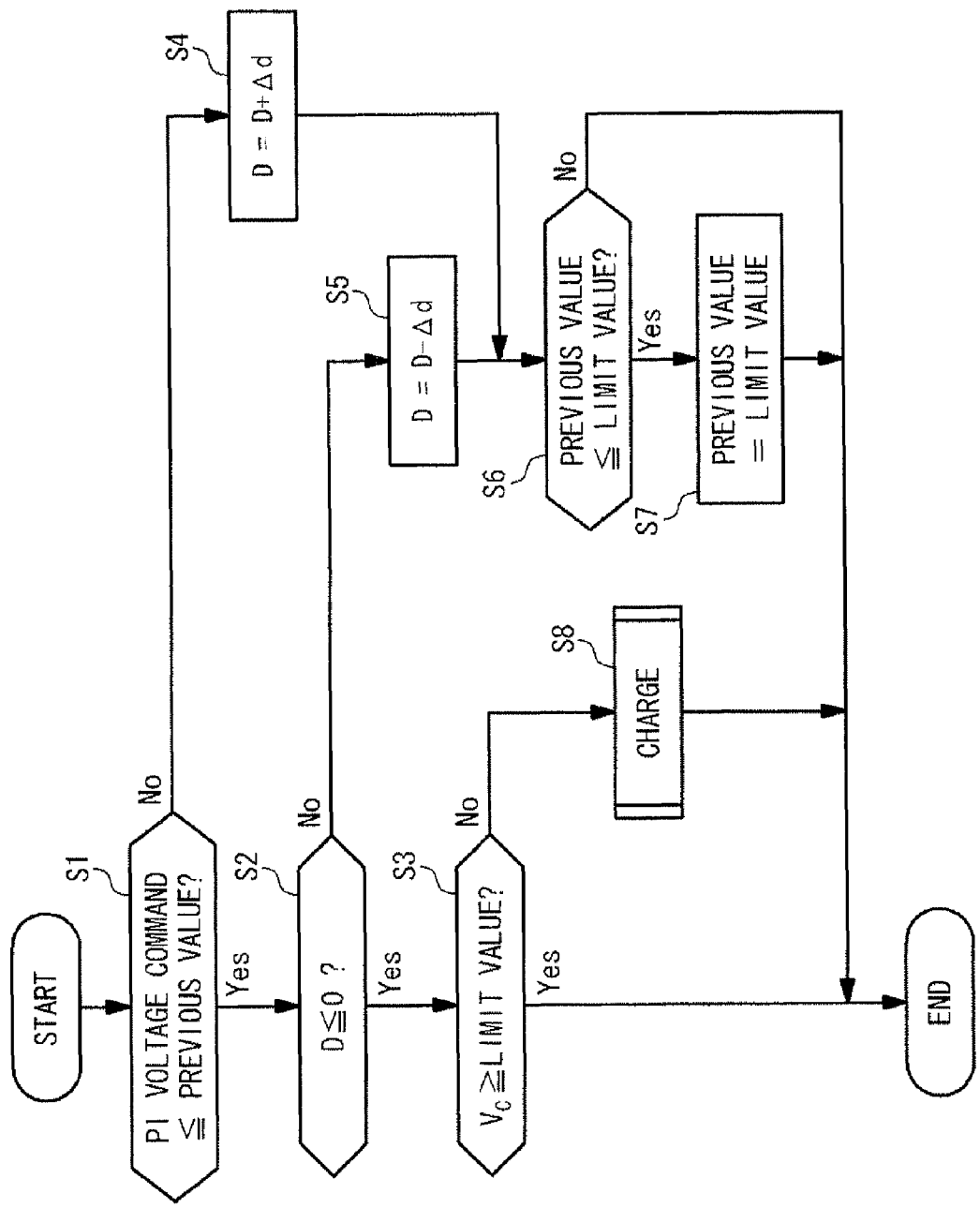
FIG. 3 is a flowchart showing the steps of PI control, limiting operation and accumulation operation.

FIG. 3 is a flow chart showing the steps of the above-described PI control, limiting operation and accumulation operation. The operations of this flow chart are performed repeatedly. First in Step S1, the PI voltage command is compared with the previous value having the lower limit equivalent to the limit value. If the PI voltage command is equal to or less than the previous value, determination is made in Step S2 as to whether or not the discharge duty D is equal to or less than zero. If the discharge duty D is equal to or less than zero, determination is made in Step S3 as to whether or not the voltage $V_C$ of the auxiliary power supply 10 is equal to or more than a threshold value. If the voltage $V_C$ is equal to or more than the threshold value, the operations are terminated.

On the other hand, if it is determined in Step S1 that the PI voltage command is more than the previous value having the lower limit equivalent to the limit value, the operation flow proceeds to Step S4 to add a predetermined value $\Delta d$ to the discharge duty D. This operation cycle is repeated so that if the PI voltage command is more than the previous value having the lower limit equivalent to the limit value, the discharge duty D is accumulated and sequentially increased. The increase in the discharge duty leads to an increased rate of time in which the switching device 13 is in the on state and hence, the drive voltage supplied to the motor drive circuit 6 is increased in the range of $V_B$ to $(V_B+V_C)$. If it is determined in Step S6 that the previous value is more than the limit value, the operations are terminated. Conversely if the previous value is equal to or less than the limit value, the previous value is set to the limit value (Step S7) before the operations are terminated.

Specifically, for example, in a case where a PI voltage command of 15V is applied when the battery voltage of 12V is set as the limit value, that is, a voltage to be supplied is above the battery voltage, the discharge duty D takes a value of more than zero so as to increase the voltage supplied to the motor drive circuit 6 till the PI voltage command is decreased to 12V or less.

It is noted here that the description is made on assumption that the auxiliary power supply 10 is completely charged. It is preferred in practice to check for the voltage $V_C$ of the auxiliary power supply 10 before it is discharged because discharging the incompletely charged auxiliary power supply actually results in the decrease in power efficiency.

If the PI voltage command is equal to or less than the previous value having the lower limit equivalent to the limit value and Step S2 determines the discharge duty D to be more than zero (namely, a positive value), the operation flow proceeds to Step S5 to subtract the predetermined value $\Delta d$ from the discharge duty D. As long as the discharge duty D takes a positive value, the discharge duty D is accumulated in minus direction by repeating the above operation cycle and is sequentially decreased. The decrease in the discharge duty leads to a decreased rate of time in which the switching device 13 is in the on state and hence, the drive voltage supplied to the motor drive circuit 6 is decreased in the range of $V_B$ to $(V_B+V_C)$. If it is determined in Step S6 that the previous value is more than the limit value, the operations are terminated. Conversely if the previous value is equal to or less than the limit value, the previous value is set to the limit value (Step S7) before the operations are terminated.

Specifically, when the PI voltage command which has exceeded the previous value having the lower limit equivalent to the limit value is now decreased to the previous value or less in the case where the battery voltage of 12V is set as the limit value, for example, the discharge duty D continues to decrease so as to decrease the voltage supplied to the motor drive circuit 6 as long as the PI voltage command remains equal to or lower than the previous value.

On the other hand, if the PI voltage command is equal to or less than the previous value having the lower limit equivalent to the limit value, the discharge duty D is equal to or less than zero (zero or negative value) and the voltage $V_C$ is less than the threshold value, the operation flow proceeds to Step S8 to charge the auxiliary power supply 10. Charging of the auxiliary power supply 10 is carried out by the control circuit 2 controllably opening and closing the switching devices 19, 20 by means of the driver circuit 21. The charging is completed at detection of a predetermined voltage by the voltage detector 11. That is, the auxiliary power supply 10 is charged when the apparatus does not require the use of the auxiliary power supply 10. The description is made on assumption that the battery 7 operates normally. In practice, it is preferred to check for the voltage $V_B$ of the battery 7 before the charging operation is started.

As described above, the electric power steering apparatus 1 according to the present embodiment can prevent an undue voltage supply from the auxiliary power supply 10 and accomplish an adequate voltage supply because if the command value of the drive voltage exceeds the previous value having the lower limit equivalent to the limit value, the control circuit 2 controls the amount of discharge from the auxiliary power supply 10 according to the difference from the previous value. Thus, the present invention can provide the electric power steering apparatus 1 which is capable of saving the energy of the auxiliary power supply 10 for efficiently using the auxiliary power supply 10.

The increase in the discharge duty D leads to the increased rate of time in which the voltage is supplied from the series connection of the battery 7 and the auxiliary power supply 10, so that the drive voltage is raised. Conversely, the decrease in the discharge duty D leads to the increased rate of time in which the voltage is supplied from the battery 7 alone, so that the drive voltage is lowered. In this manner the accumulation operation for sequential increase or decrease of the drive voltage is performed to provide a smooth fluctuation of the drive voltage.

When the command value is less than the previous value having the lower limit equivalent to the limit value, the control circuit 2 sequentially decreases the discharge duty D if the discharge duty D is more than zero. Consequently when the discharge duty D is decreased to zero and the voltage of the auxiliary power supply is decreased to below the predetermined threshold value, the control circuit 2 drives the charge circuit 22 to charge the auxiliary power supply 10. Therefore, the steering system can obviate the waste of energy because the charging operation is performed when the auxiliary power supply 10 is not required to discharge. Furthermore, if the voltage of the auxiliary power supply 10 is equal to or more than the threshold value, the steering system does not charge the auxiliary power supply thereby avoiding undue charging of the auxiliary power supply.

The invention claimed is:

1. An electric power steering apparatus that generates a steering assist force by a motor, comprising:
   a motor drive circuit for driving the motor;
   a current detector for detecting an actual current supplied from the motor drive circuit to the motor;
   a battery for supplying a drive voltage to the motor drive circuit;
   an auxiliary power supply connected in series to the battery and capable of supplying a drive voltage to the motor drive circuit;
   a discharge circuit including switching devices for alternately opening and closing a first electrical conduction path for supplying the motor drive circuit with a drive voltage from the battery alone and a second electrical conduction path for supplying the motor drive circuit with a drive voltage from a series connection of the battery and the auxiliary power supply; and
   a control circuit that controls the motor drive circuit for driving the motor to generate the steering assist force, the control circuit determining a command value of a drive voltage to be supplied to the motor drive circuit based on the actual current and a target current and controlling the amount of discharge from the auxiliary power supply according to a difference between the command value and its previous value if the command value exceeds the previous value having a lower limit equivalent to a limit value representing the limit of the power supply from the battery.

2. The electric power steering apparatus according to claim 1, wherein, when the command value is more than the previous value having the lower limit equivalent to the limit value, the control circuit sequentially increases a discharge duty equivalent to a period in which the second electrical conduction path is closed, but when the command value is less than the previous value having the lower limit equivalent to the limit value and the discharge duty is more than zero, the control circuit sequentially decreases the discharge duty.

3. The electric power steering apparatus according to claim 1, further comprising:
   a voltage detector for detecting an auxiliary power supply voltage generated between terminals of the auxiliary power supply; and
   a charge circuit for charging the auxiliary power supply based on the voltage of the battery,
   wherein, when the command value is less than the previous value having the lower limit equivalent to the limit value and if a discharge duty is more than zero, the control circuit sequentially decreases the discharge duty, and consequently when the discharge duty is decreased to zero and the auxiliary power supply voltage is decreased to below a predetermined threshold value, the control circuit drives the charge circuit to charge the auxiliary power supply.

* * * * *